US008503651B2

(12) United States Patent
Virolainen et al.

(10) Patent No.: US 8,503,651 B2
(45) Date of Patent: Aug. 6, 2013

(54) TELECONFERENCING CONFIGURATION BASED ON PROXIMITY INFORMATION (75) Inventors: Jussi Virolainen, Espoo (FI); Jukka Saunamaki, Helsinki (FI); Jari Selin, Espoo (FI)

(73) Assignee: Nokia Corporation, Espoo (FI)

( * ) Notice: Subject to any disclaimer, the term of this patent is extended or adjusted under 35 U.S.C. 154(b) by 1293 days.

(21) Appl. No.: 11/616,492

(22) Filed: Dec. 27, 2006

(65) Prior Publication Data

US 2008/0160976 A1 Jul. 3, 2008

(51) Int. Cl.
H04M 3/42 (2006.01)

(52) U.S. Cl.
USPC ................... 379/202.01; 379/209.01

(58) Field of Classification Search
USPC ....... 379/202, 209, 202.01, 209.01; 455/416, 455/456.1, 9, 456
See application file for complete search history.

(56) References Cited

U.S. PATENT DOCUMENTS

| | | | |
|---|---|---|---|
| 5,991,385 A | 11/1999 | Dunn et al. | |
| 6,163,692 A * | 12/2000 | Chakrabarti et al. | 455/416 |
| 7,043,254 B2 | 5/2006 | Chawla et al. | |
| 7,292,845 B2 | 11/2007 | Flannery | |
| 7,852,998 B1 | 12/2010 | Smith et al. | |
| 2002/0107008 A1 * | 8/2002 | Hendrey et al. | 455/416 |
| 2002/0142788 A1 | 10/2002 | Chawla et al. | |
| 2003/0083059 A1 | 5/2003 | Spitzer et al. | |
| 2004/0116130 A1 * | 6/2004 | Seligmann | 455/456.1 |
| 2004/0213419 A1 | 10/2004 | Varma et al. | |
| 2005/0094578 A1 | 5/2005 | Pasha et al. | |
| 2005/0113107 A1 | 5/2005 | Meunier | |
| 2005/0180582 A1 | 8/2005 | Guedalia | |
| 2005/0212908 A1 * | 9/2005 | Rodman et al. | 348/14.08 |
| 2005/0239487 A1 | 10/2005 | Glass et al. | |
| 2006/0132595 A1 | 6/2006 | Kenoyer et al. | |
| 2007/0016426 A1 | 1/2007 | Hershey et al. | |
| 2007/0050451 A1 | 3/2007 | Caspi et al. | |
| 2007/0097886 A1 | 5/2007 | Schwagmann et al. | |
| 2007/0202890 A1 | 8/2007 | Feher | |

(Continued)

FOREIGN PATENT DOCUMENTS

EP 1868362 12/2007

OTHER PUBLICATIONS

International Search Report and Written Opinion for International Application No. PCT/IB2007/003845 mailed Jun. 20, 2008, 13 pages.

(Continued)

*Primary Examiner* — Amal Zenati
(74) *Attorney, Agent, or Firm* — Banner & Witcoff, Ltd (57) ABSTRACT Teleconferencing systems may adapt to changes associated with participating terminals by monitoring characteristics of the terminals and modifying audio streams in accordance with detected changes. A terminal moving from a location shared with one or more other participating terminals may be detected in a variety of ways. In response to the location change, a teleconference server may modify the audio stream transmitted to the terminal so that audio originating from the one or more other participating terminals is included in the stream. Additionally, audio streams transmitted to the one or more other terminals may also be modified to include audio signals originating from the moved terminal. Other changes to a terminal that may also affect audio processing include activating a muting function. Muting a terminal while the terminal is among a group of participating terminals may cause the audio signals from the other terminals to also be muted.

18 Claims, 10 Drawing Sheets

U.S. PATENT DOCUMENTS

2007/0288998 A1* 12/2007 Gudigara et al. .............. 726/5
2007/0291918 A1 12/2007 Diethorn
2010/0020954 A1 1/2010 Gilg et al.

OTHER PUBLICATIONS

International Preliminary Report on Patentability for International Application No. PCT/IB2007/004013, mailed Jul. 9, 2009, 8 pages.

Schulzrinne et al, "Application-Layer Mobility Using SIP", Mobile Computing and Communications Review, ACM, New York, NY, US, vol. 4, No. 3, Jul. 1, 2000, pp. 47-57, XP000992003, ISSN 1091-1669, section III.B.2 mid-call mobility; figure 33.

Figueiras et al, "Accuracy and Timing aspects of Location Information based on Signal-Strength Measurements in Bluetooth", IEEE International Symposium on Personal, Indoor and Mobile Radio Communications, (PIMRC), vol. 4, Sep. 11-14, 2005, pp. 2685-2690, XP010928179, ISBN: 978-978-38007-2-4, section I.

International Search Report and Written Opinion for International Application PCT/IB2007/004013, mailed Jul. 10, 2008, 15 pages.

Nishiguchi, S., Higashi, K., Kameda, Y. and Minoh, M., "A Sensor-Fusion Method for Detecting a Speaking Student", 2003 International Conference on Multimedia and Expo, Publication Date Jul. 6-9, 2003, vol. 1, pp. I-129-I-132.

Mandal, Atri, Lopes, Cristina V., Givargis, Tony, Haghighat, Amir, Jurdak Raja and Baldi, Pierre, "Beep: 3D Indoor Positioning Using Audible Sound", IEEE Consumer Communicatiosn and Networking Conference, Jan. 2005, pp. 348-353.

Office Action for U.S. Appl. No. 11/616,508 mailed Sep. 15, 2010.
Office Action for U.S. Appl. No. 11/616,474 mailed Apr. 12, 2011.
Office Action for U.S. Appl. No. 11/616,474 mailed Oct. 25, 2011.

* cited by examiner

| | Local | Stand-alone |
|---|---|---|
| Hands free | Hands free (local)<br><br>User participates a conference call with other people in same space.<br>There are at least two terminals in the space that participate conference call.<br><br>Terminal is in hands free mode and works as a part of distributed audio sensor (microphone, loudspeaker) network. | Hands free (stand-alone)<br><br>User participates a conference call with possible other people in same space.<br>User's terminal is only terminal that participates conference call.<br><br>Terminal is in the hands free mode. |
| Headset | Headset (local)<br><br>User participates a conference call with other people in same space.<br>There are at least two terminals in the space that participate conference call.<br><br>Terminal can be part of distributed audio sensor network, but the user prefers using headset to the hands free loudspeaker | Headset (stand-alone)<br><br>User participates a conference call without any other participants in same space.<br><br>Terminal is in headset mode |

TELECONFERENCING CONFIGURATION BASED ON PROXIMITY INFORMATION

FIELD OF ART

The invention relates generally to distributed teleconferencing. In particular, the invention relates to managing and configuring a distributed teleconference.

BACKGROUND

With the increasingly global nature of communications, teleconferencing has become a popular method of facilitating meetings between individuals in remote locations. For example, teleconference participants may dial-in to a conference bridge using a communication terminal such as a mobile phone or a speakerphone device. In typical teleconferences, participants located at the same location may use a communication system that includes a microphone and speaker combination. However, some participants may prefer to use their own communication terminals even if they are in the same room as other participants. The use of multiple audio sensors (e.g., microphones) within the same room may create audio processing issues such as feedback and other anomalies.

In current systems, if users at the same location or common acoustic space dial-in using individual terminals, there is no way to compensate for this organization of terminals in the downstream signals sent to each terminal. Thus, users will often hear not only the other participants in the teleconference but also themselves. Such feedback may create confusion and create significant hurdles in facilitating and conducting teleconferences. Additionally, current teleconferencing systems and methods often do not compensate for changes in a terminal and/or user's location. For example, if a user moves from a room with other teleconference participants (e.g., a common acoustic space) to another location, the teleconference system is often unaware of this environmental change. As such, audio mixing might not properly compensate for this relocation or switch. Still further, the activation of certain functions on a terminal during a teleconference may be rendered ineffective if other terminals in the same room also do not activate the same function. One example of such a function is mute. In a teleconference environment where two users and two terminals are situated in the same location, merely muting one of the two terminals might not be sufficient to hide the audio from the corresponding user. Accordingly, methods and systems for improving audio mixing to compensate for various teleconferencing configurations are needed.

SUMMARY

This summary is provided to introduce a selection of concepts in a simplified form that are further described below in the Detailed Description. The Summary is not intended to identify key features or essential features of the claimed subject matter, nor is it intended to be used to limit the scope of the claimed subject matter.

Using proximity information and/or context information, the location and status of a terminal may be monitored by a teleconference server. The location of a terminal may be monitored in a variety of ways including manual notification by a user of the terminal, tracking network characteristics of the terminal and/or context information monitoring by the teleconference server. In response to changes in the terminal's location and/or status, the teleconference server may modify one or more aspects of the teleconference to compensate for the change. In one or more aspects, a terminal's change in location may affect the way audio is mixed by the teleconference server. For example, if a terminal moves from a location being shared by other teleconference participants to a private location absent of other participants, a teleconference server may modify the audio streams distributed to the other teleconference participants and to the moved terminal. Particularly, the teleconference server may add audio signals originating from the moved terminal to one or more audio streams designated for the other teleconference participants in the shared location. In addition, the server may add audio signals originating from the other teleconference participants to an audio stream designated for the moved terminal. Alternatively or additionally, if a terminal moves from a private location to a shared group location, audio signals may be filtered out to prevent feedback.

According to one or more aspects, activation of various terminal or teleconferencing functionalities may affect audio streams distributed to teleconference participants. In one example, activating a mute functionality in a first terminal may cause audio signals from a second terminal in the same location as the first terminal to also be muted or filtered out of audio streams distributed to other teleconference participants. Such a system and method may be used so that muting of a first terminal may achieve the desired effect. If such systems and methods were not used, even though the first terminal is muted, audio from a user of the first terminal may still be picked up and transmitted by the second terminal. As such, muting of all terminals in a shared location may be used to avoid such occurrences.

BRIEF DESCRIPTION OF THE DRAWINGS

The foregoing summary of the invention, as well as the following detailed description of illustrative embodiments, is better understood when read in conjunction with the accompanying drawings, which are included by way of example, and not by way of limitation with regard to the claimed invention.

DETAILED DESCRIPTION

In the following description of various illustrative embodiments, reference is made to the accompanying drawings, which form a part hereof, and in which is shown, by way of illustration, various embodiments in which the invention may be practiced. It is to be understood that other embodiments may be utilized and structural and functional modifications may be made without departing from the scope of the present invention.

Figure 1:
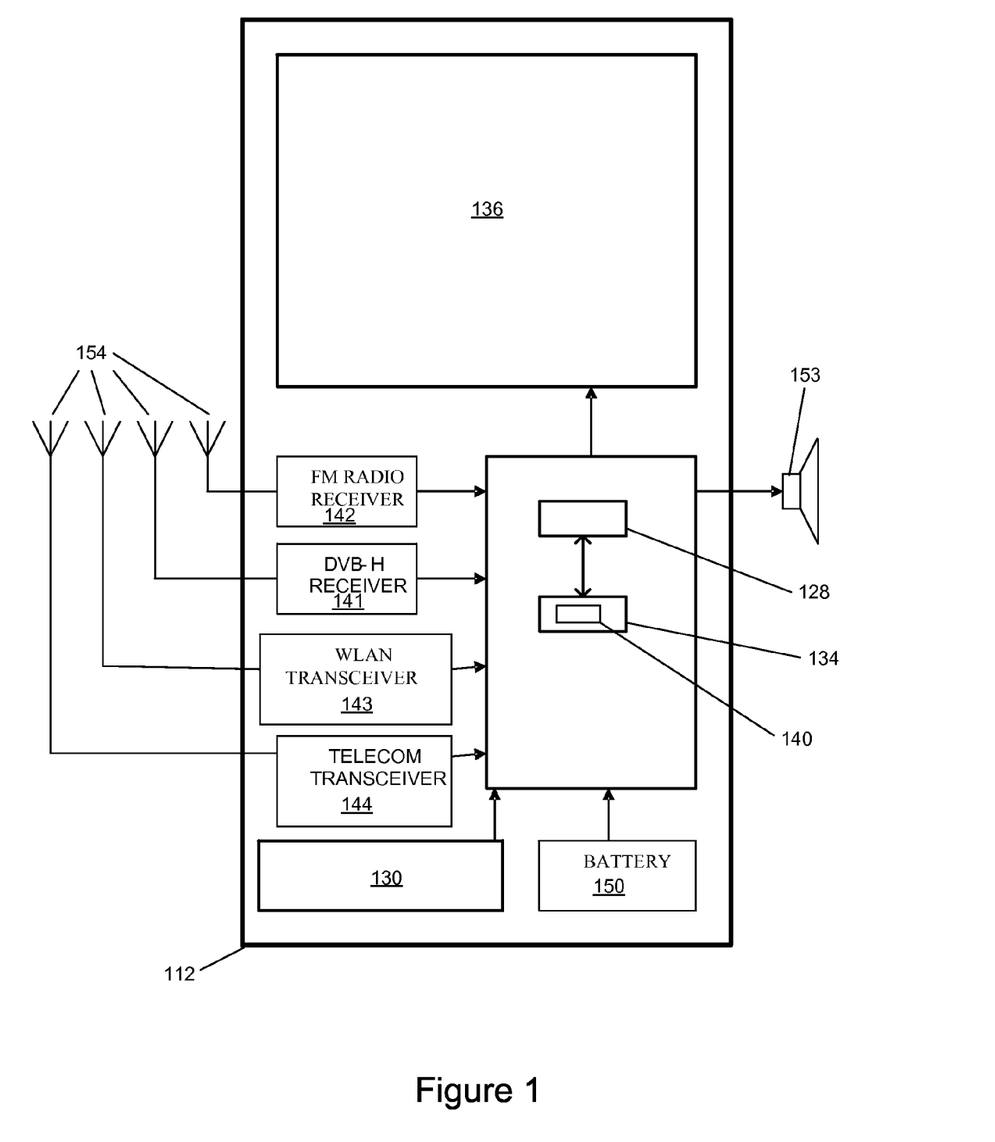
FIG. 1 illustrates a mobile terminal on which one or more aspects described herein may be implemented.

FIG. 1 illustrates a block diagram of a terminal including processor 128 connected to user interface 130, memory 134 and/or other storage, and display 136. Mobile terminal 112 may also include battery 150, speaker(s) 153 and antennas 154. User interface 130 may further include a keypad, touch screen, voice interface, one or more arrow keys, joy-stick, data glove, mouse, roller ball, touch screen, or the like. Mobile terminal 112 may comprise a computer, personal data assistant (PDA), mobile telephone and the like.

Computer executable instructions and data used by processor 128 and other components within mobile terminal 112 may be stored in a computer readable memory 134. The memory may be implemented with any combination of read only memory modules or random access memory modules, optionally including both volatile and nonvolatile memory. Software 140 may be stored within memory 134 and/or storage to provide instructions to processor 128 for enabling mobile terminal 112 to perform various functions. Alternatively, some or all of mobile device 112 computer executable instructions may be embodied in hardware or firmware (not shown).

Mobile terminal 112 may be configured to receive, decode and process digital broadband broadcast transmissions that are based, for example, on the DVB standard, through a specific DVB receiver 141. The mobile device may also be provided with other types of receivers for digital broadband broadcast transmissions. Additionally, mobile terminal 112 may also be configured to receive, decode and process transmissions through FM/AM Radio receiver 142, WLAN transceiver 143, and telecommunications transceiver 144. Transceivers 143 and 144 may, alternatively, be separated into individual transmitter and receiver components (not shown). In one aspect of the invention, mobile terminal 112 may receive Radio Data System (RDS) messages. Other transmission and reception systems may also be used including Bluetooth transceivers. In one or more instances, signals may be transmitted to and received from another mobile terminal (not shown). For example, audio, video and other signals may be transmitted between two terminals using various transmissions protocols (e.g., WLAN, Bluetooth, or WIBREE).

Figure 2A:
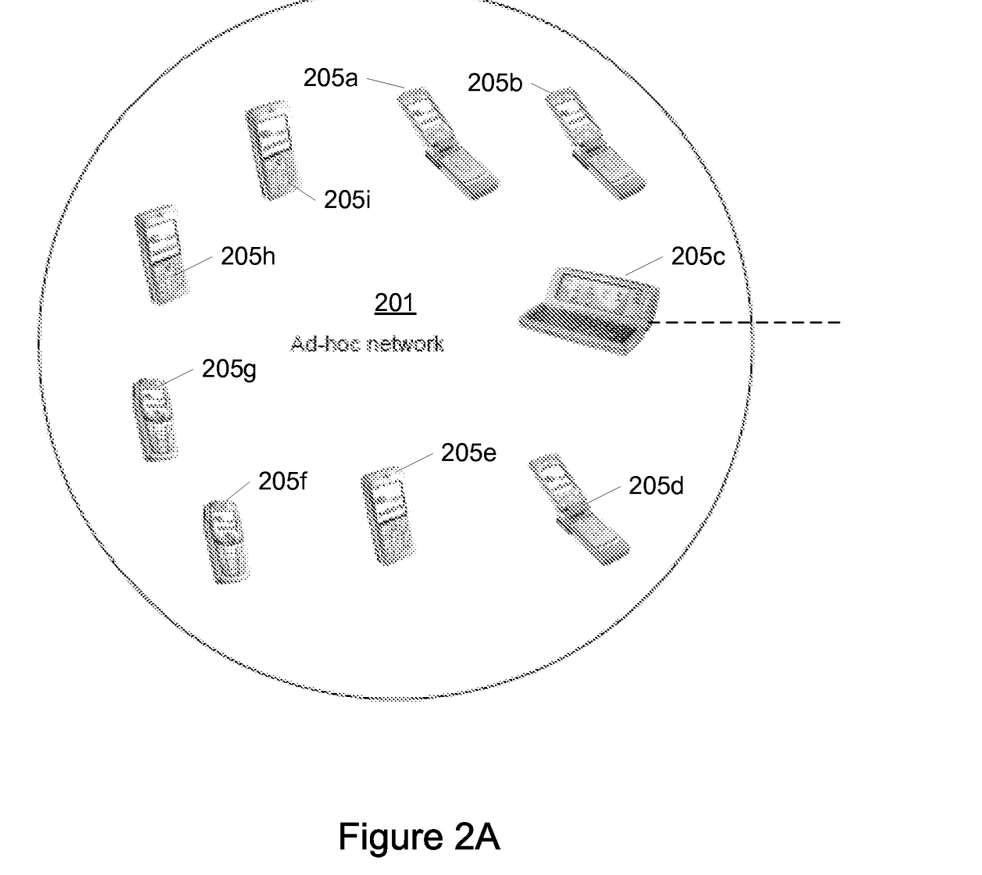
FIGS. 2A and 2B illustrate two distributed teleconferencing system configurations according to one or more aspects described herein.
Figure 2B:
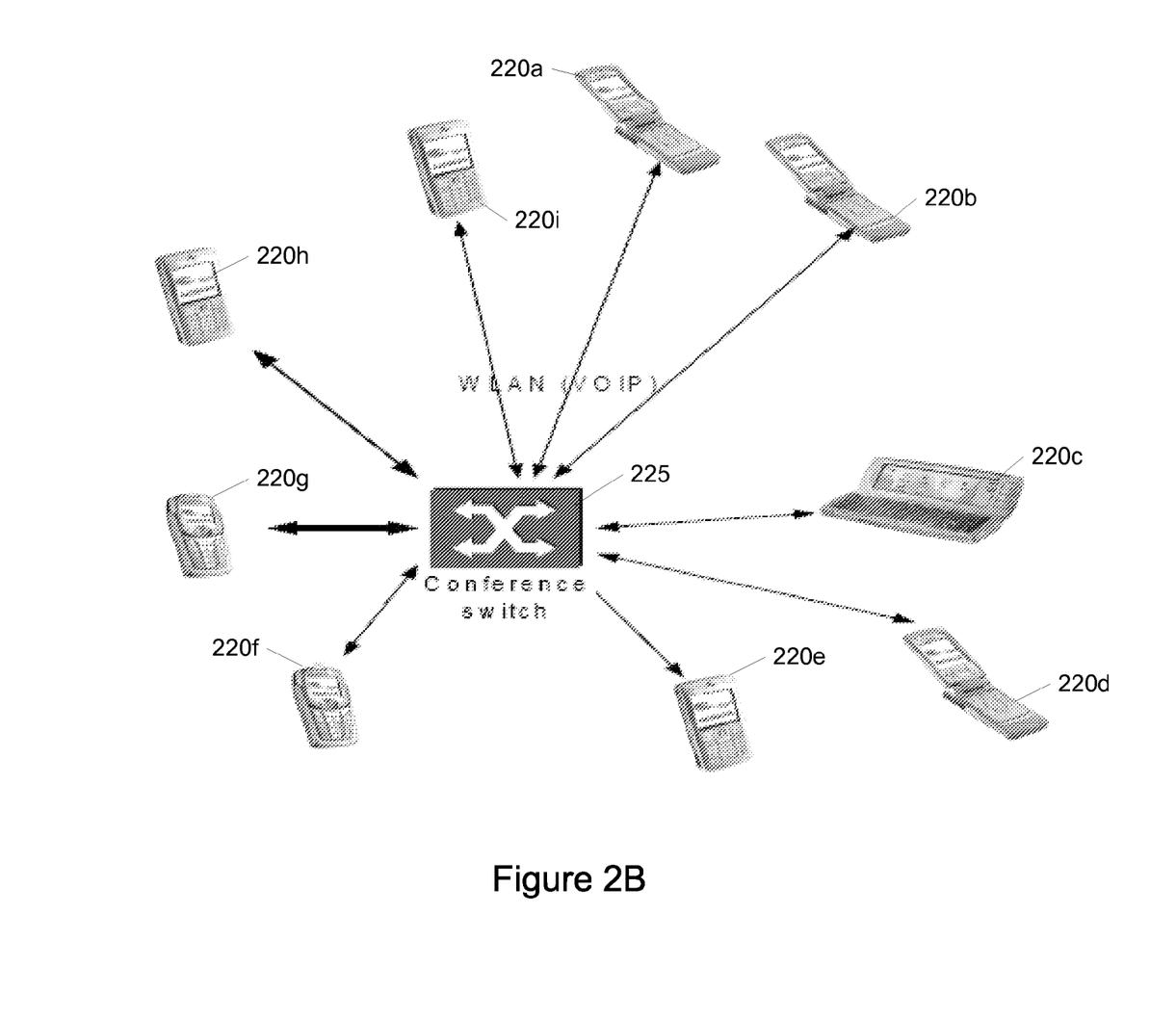

FIGS. 2A and 2B illustrate two distributed teleconferencing configurations in which aspects of group formation systems and methods may be used. For example, FIG. 2A illustrates a distributed teleconferencing system configured according to a client-based approach. That is, terminals 205 are connected to one another prior to connecting to a conference switch. Terminals 205 may comprise mobile communication devices such as mobile terminal 112 of FIG. 1, personal computers (PCs), personal data assistants (PDAs) and the like. In one example, terminals 205 may establish teleconference network 201 by using inherent communication capabilities (e.g., 3-way calling) to connect each device to an overall teleconference like network 201. Terminals 205 may also create an ad-hoc communication network by establishing a shared network connection. Teleconferencing network 201 and terminals 205 associated therewith may further be connected to a conference switch (not shown) through a master device such as terminal 205c. Master device 205c may connect to a conference switch through a variety of wired or wireless networks including plain old telephone service (POTS), IP telephony (using, e.g., Session Initiation Protocol), and the like. Master device 205c may be responsible for receiving downstream signals from the conference switch and mixing signals from terminals 205 into a single upstream signal for transmitting to the switch or another destination. Additionally, a conference switch may be used to connect terminals 205 of network 201 to other terminals (not shown) or other teleconference networks (not shown). Additional details regarding distributed teleconferencing may be found in PCT Application No. FI2005/050264, entitled "System for Conference Call and Corresponding Devices."

FIG. 2B illustrates an environment in which terminals 220 are connected to a teleconference through a conference switch, e.g., switch 225. In contrast to terminals 205 of FIG. 2A, terminals 220 of FIG. 2B connect to a teleconference by establishing connections with switch 225. As such, switch 225 may be able to coordinate the establishment of the teleconference by managing the connections with terminals 220. In such a scenario, a master device (e.g., master device 205c of FIG. 2A) might not be needed to facilitate teleconferencing functionalities. Conference switch 225 may be responsible for configuring and routing audio signals to and from terminals 220 as well as tracking the locations and modes of terminals 220. In one or more arrangements, conference switch 225 may further perform audio filtering functions to insure optimal communication quality.

One audio filtering function that a conference switch such as switch 225 of FIG. 2B may perform is acoustic signal cancellation for sounds that originate from the same acoustic space. For example, if two terminals are connected to the same teleconference from the same room, the audio signals originating from each of the two terminals might not need to be sent to the other terminal in the room. As such, conference switch 225 may filter signals originating from a first terminal from a downstream audio signal to a second terminal located in the same acoustic space as the first terminal. Filtering, as described herein, refers to the exclusion or subtraction of an audio signal from a mixed audio stream. If filtering is not performed, significant feedback may result. In order to perform such filtering functions, conference switch 225 or another system may initially need to identify which terminals are in the same acoustic space. Acoustic proximity information may also be used for a variety of other purposes including for visually conveying teleconference participant locations on a user interface.

Figure 3:
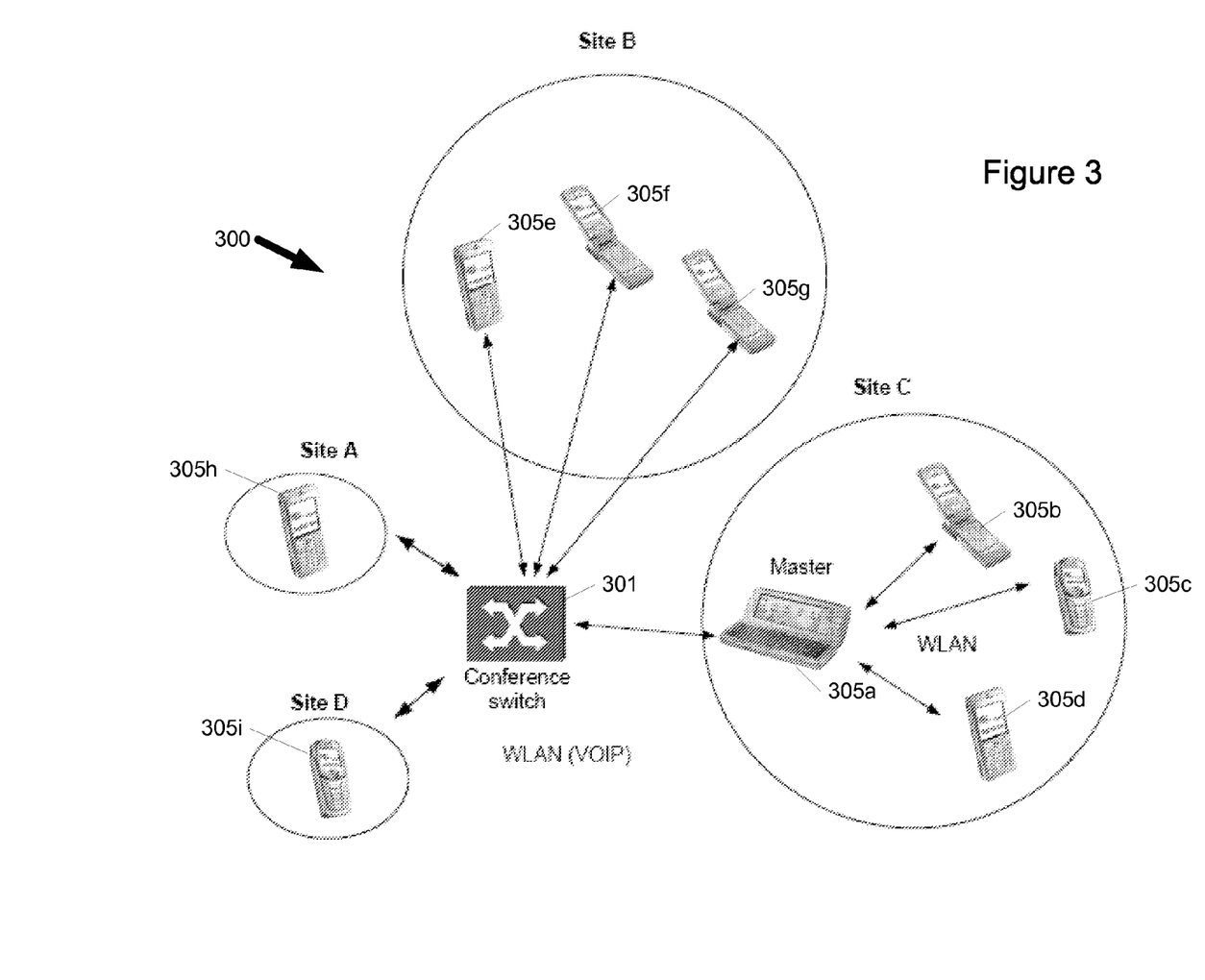
FIG. 3 illustrates a teleconference network diagram showing proximity groupings of a plurality of terminals according to one or more aspects described herein.

FIG. 3 illustrates a teleconference network diagram showing proximity groupings of terminals 305. Teleconference network 300 may include multiple terminals 305 along with conference switch 301 that facilitates conferencing between the various terminals 305. According to one or more aspects, conference switch 301 may further group terminals 305 according to acoustic location or proximity. For example, terminals 305a, 305b, 305c and 305d may be grouped together as being located in acoustic site (i.e., common acoustic space) C while terminals 305e, 305f and 305g may be grouped together as acoustic site B. Each of terminals 305h and 305i may be connected to teleconference network 300 from their own independent locations (i.e., no other teleconferenced terminals in acoustic proximity). By determining the acoustic locations of each terminal, switch 301 may prepare downstream signals for each of terminals 305 with little or no feedback. In particular, switch 301 may filter out audio signals that originate from the same acoustic location as that of the terminal to which the downstream signal is being sent. Accordingly, terminal 305g might not receive audio signals originating from 305f since terminals 305g and 305f are located at the same acoustic site (i.e., site B) and the users of terminals 305g and 305f would, presumably, hear the audio even without being connected to teleconference network 300.

Figure 4:
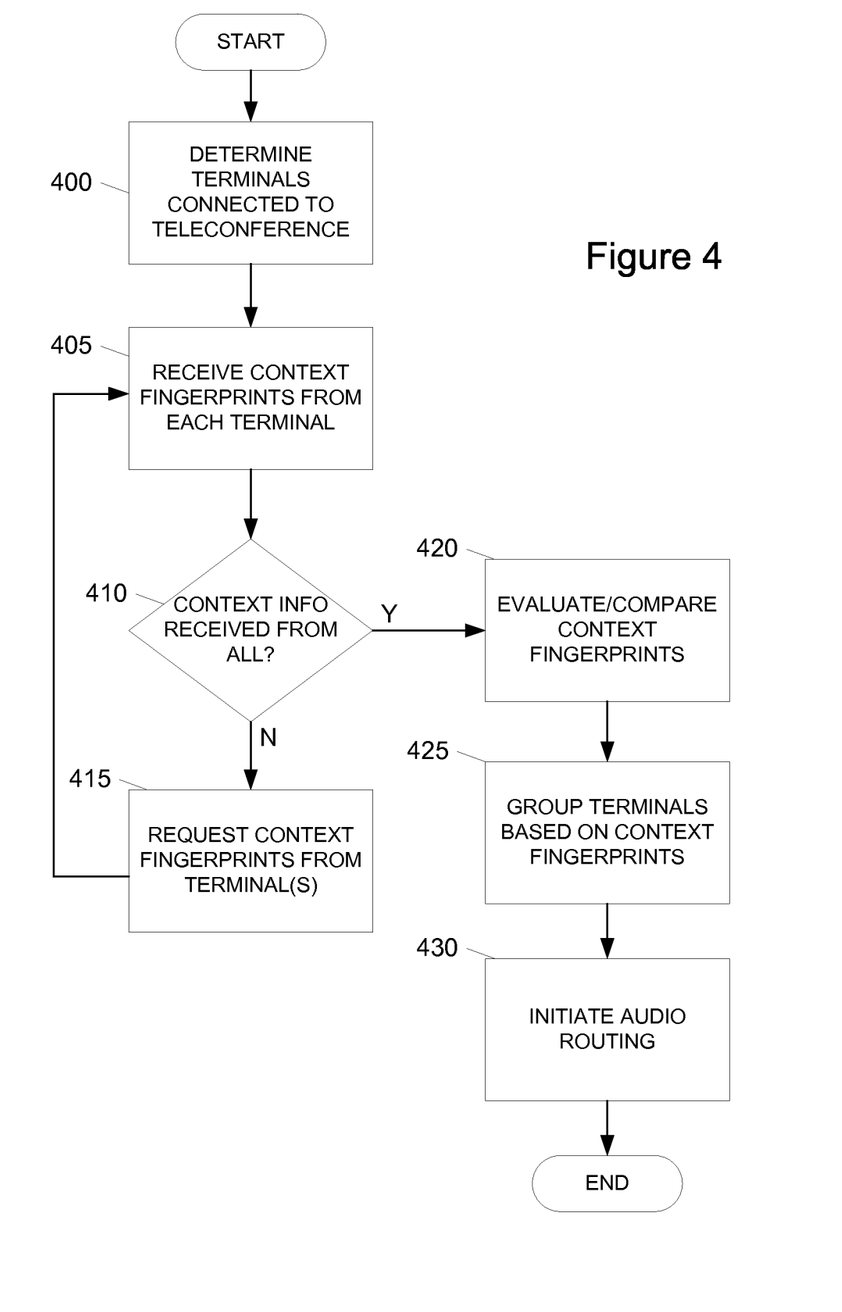
FIG. 4 illustrates a method for determining proximity groups in a teleconference network according to aspects described herein.

FIG. 4 illustrates a method for determining proximity groups in a teleconference network according to aspects described herein. In step 400, a conference switch or network master may determine a set of terminals connected to a teleconference. For example, terminals, upon connecting to the conference switch or the teleconference, may initially register with the teleconference using identification information. Identification information may include a network address, session initiation protocol (SIP) uniform resource identifier (URI), a device name, a media access control (MAC) address and the like. A network master, as used herein, generally refers to a device or system that is used to configure a teleconference network or sub-network. A network master may comprise a conference switch or a terminal acting as a proxy for other terminals in a teleconference network. In step 405, the network master may receive context fingerprints from each of the terminals connected to the teleconference. Context fingerprints, as used herein, may relate to information derived from signals or characteristics associated with any type of sensor for detecting an environment or context in which the sensor is located. Context fingerprints may include audio frame energy detected from a microphone of a mobile terminal, GPS coordinates, FM radio signals, global system for mobile communication (GSM) signals, wireless local area network (WLAN) characteristics and/or camera signals. One of ordinary skill in the art will appreciate that a variety of other sensor devices may also be used for environment and proximity detection.

In step 410, the network master may determine whether context fingerprints have been received from all of the terminals in the teleconference. If the network master determines that fingerprints are missing from one or more terminals, the master may issue a fingerprint request to those one or more terminals in step 415. If, however, fingerprints have been received from all of the registered terminals, the network master may then evaluate the fingerprints to determine location similarity between terminals in step 420. For example, the GPS coordinates of two terminals may be compared to determine proximity while acoustic energies reported by two other terminals may be evaluated to determine a similarity between the two. The greater the similarity in the acoustic energies, the stronger the presumption may be that the two terminals are in proximity to one another. Camera sensor readings may be used to detect proximity by processing the overall brightness of the room or environment in which the terminal or terminals are located. The brightness may then be compared with the brightness of camera sensor readings from one or more other terminals. Further, terminals connecting through the same WLAN network (e.g., determined based on names, channels and/or network strengths) may also be identified based on common connection attributes. BLUETOOTH information may also be used to determine which devices are within a BLUETOOTH range or neighborhood of one another. GSM base station cell addresses may also be evaluated to determine whether two or more terminals are located within the same GSM cell. If they are, the terminals may be clustered in the same acoustic grouping. Alternatively or additionally, multiple types of sensor readings may be compared and/or evaluated prior to making a proximity grouping decision.

Similarity between context fingerprints may be evaluated in a variety of ways. For example, a threshold similarity may be defined such that a similarity score determined from a comparison of two context fingerprints must meet the threshold in order for the corresponding terminals to be considered in the same location. In another example, a number of sensor readings may be required to match prior to concluding that two or more terminals are in the same location. In yet another example, n-dimensional Euclidean distances or correlations may be computed for two context fingerprints to determine a location similarity score.

Once the context fingerprints have been evaluated, the terminals may then be clustered into one or more location groups based on their context fingerprints in step 425. A threshold distance may be established to set the boundaries of the group membership. For example, a threshold distance may be defined as a distance at which audio from a user of a first terminal may be received at a second terminal. Once proximity groups have been established in step 425, the network master may initiate audio routing in the teleconference in step 430. That is, the network master may begin receiving audio signals from each of the terminals and routing the signals in accordance with the proximity groupings. In particular, audio signals received from a first terminal might be filtered from a downstream audio signal to a second terminal if the first and second terminals are in the same proximity group or location. The monitoring of context fingerprints may continue even once audio routing has been initiated. For example, terminals may be directed to send periodic context fingerprints (e.g., once every 5 seconds) so that groupings may be updated if users move out of a group and/or into a group.

Additionally or alternatively, feature extraction or context fingerprint detection and/or other data transmissions may be synchronized by the network master. For example, synchronization may be used for transmitting security information from each terminal. Unsynchronized security information received from a terminal may indicate, for example, that the terminal is an unauthorized participant in the teleconference. Synchronization may be established in a variety of ways such as based on a predefined transmission schedule. According to one or more aspects, synchronization may be established for local groups rather than the entire teleconference. As such, a first set of terminals in a first acoustic space may be synchronized according to a first schedule while a second set of terminals in a second acoustic space may be synchronized according to a different second schedule.

Synchronization may also be used to compensate for sensor signals that may be subject to rapid changes, such as audio signals. As such, to obtain an optimal comparison, simultaneous audio signals may be used. A network master may synchronize feature extraction by establishing a periodic request schedule such that a context fingerprint request is transmitted to all terminals at the same time according to the schedule. In one or more configurations, a network master or conference switch may set a threshold signal level by sending a predefined event to the terminals. Fingerprint calculation is triggered and a context fingerprint is transmitted when a corresponding signal level crosses the threshold (e.g., acoustic signal level). In one example, when a stationary signal such as a BLUETOOTH neighborhood changes, it likely indicates that a participant has left the room or acoustic space. Furthermore, requests may be synchronized according to when a particular signal changes values. New synchronizations may also be configured if, for example, the server detects significant changes or fluctuations in a context fingerprint.

Figure 5:
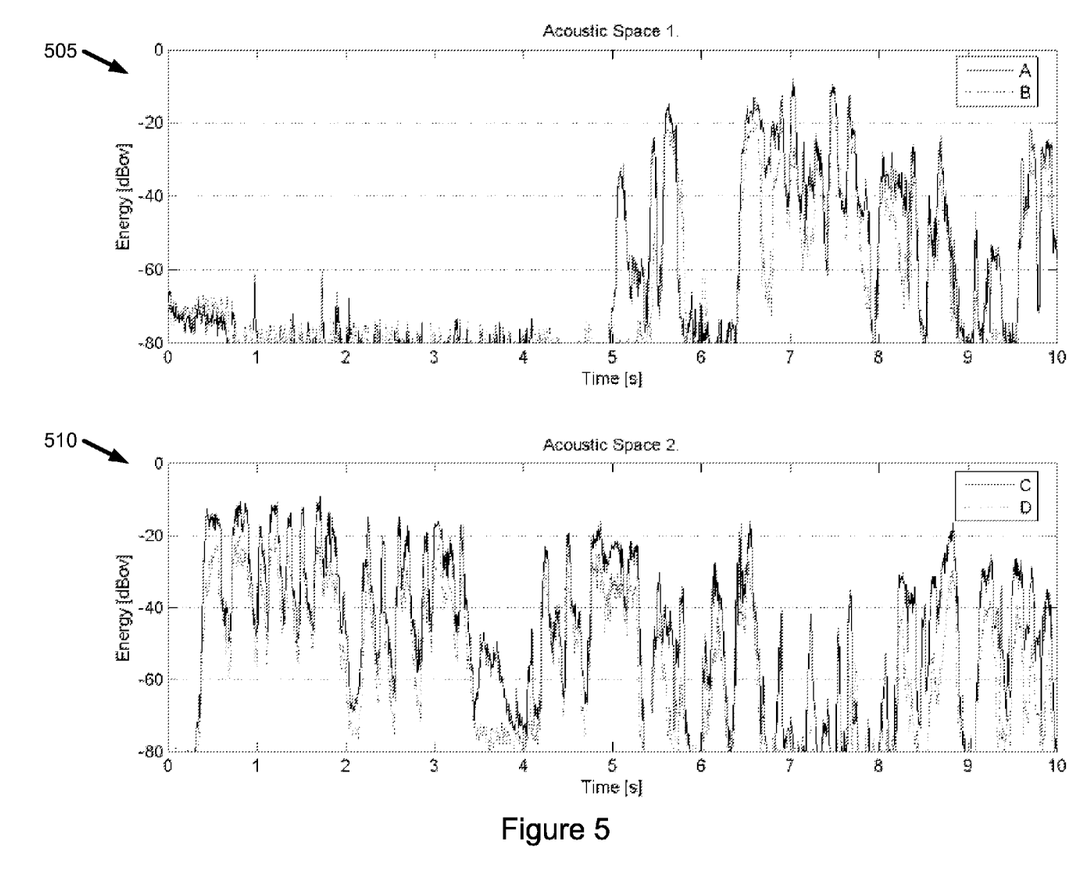
FIG. 5 illustrates comparison graphs of acoustic energies reported by multiple terminals according to one or more aspects described herein.

FIG. 5 illustrates graphs of acoustic energies reported by four terminals A, B, C and D. For example, in graph 505, the acoustic energies of terminals A and B are graphed against a period of 10 seconds to determine a level of similarity. Likewise, in graph 510, the acoustic energies reported by terminals C and D are also graphed against a period of 10 seconds to evaluate the similarity between those terminals during that period of time. As is evident from the graphs, terminals A and B appear to be in the same acoustic space (i.e., since they report substantially similar acoustic energies) while terminals C and D appear to be in the same acoustic environment. Using variance calculations, a conference server may determine a level of similarity between the energies. This level of similarity may further be compared to a threshold to determine whether the acoustic energies are sufficiently similar. This is but one example of how sensor signals may be compared and used to determine acoustic proximity between two terminals in a teleconference. Other calculations and interpretations may be applied in evaluating the similarity between two or more signals.

Figure 6:
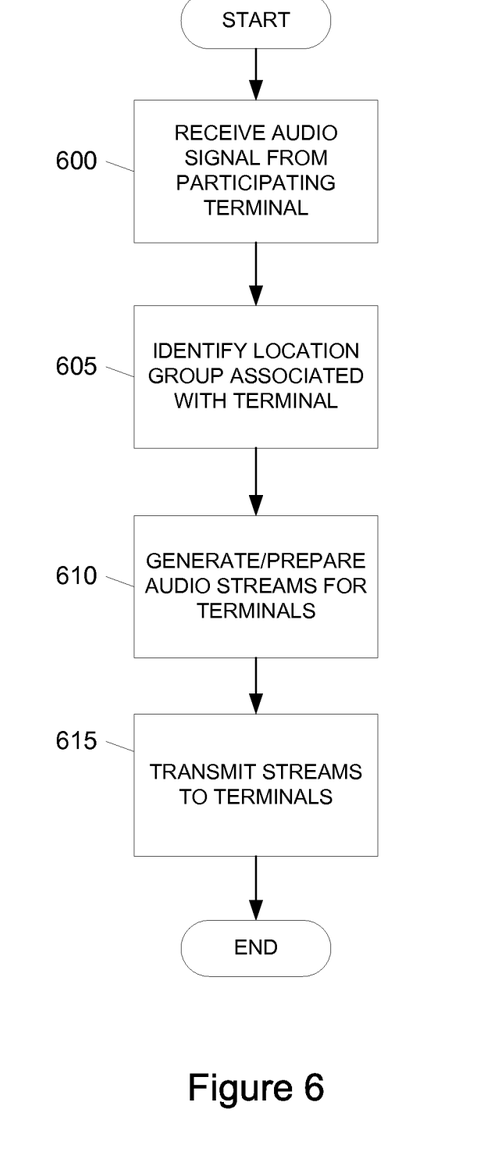
FIG. 6 illustrates a method for routing audio signals received from a terminal to one or more other terminals participating in a teleconference according to one or more aspects described herein.

FIG. 6 is a flowchart illustrating a method for routing audio signals received from a terminal to one or more other terminals. In step 600, an audio signal may be received from a terminal connected to a teleconference. In step 605, a location or group to which the terminal belongs may be identified. The network master or conference switch may store location or group assignments in a database and may retrieve this information using a terminal ID corresponding to the originating terminal (e.g., network address, MAC address, etc.). Once the location or group has been identified, the network master may prepare audio streams for each of the locations or groups in step 610. In preparing the audio streams, the network master may filter out the received audio signal from the audio stream directed toward the identified location or group. In particular, the network master might not mix the received audio signal into the audio stream corresponding to the identified location or group. Once the audio streams have been generated, the streams may be transmitted to their respective destinations in step 615.

Figure 7:
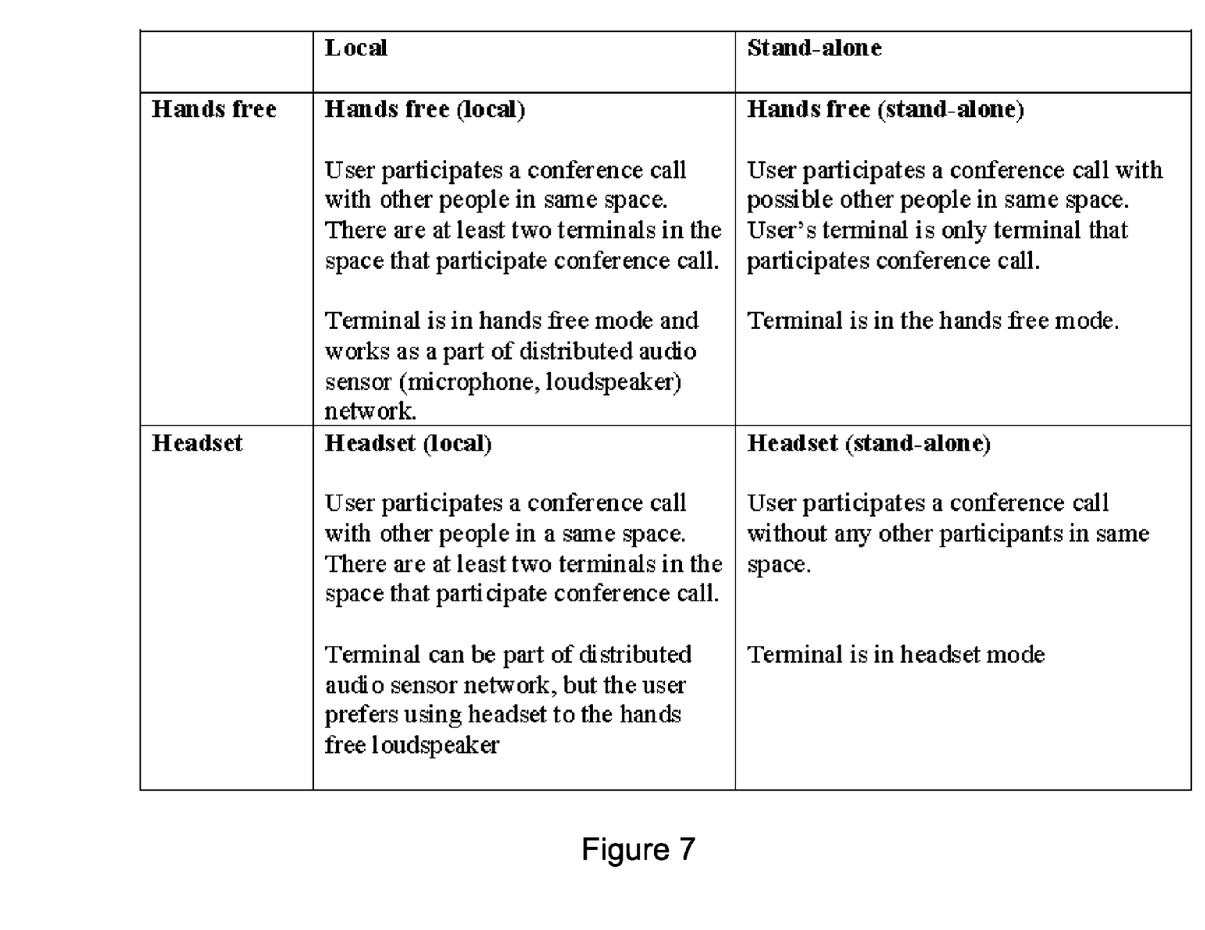
FIG. 7 illustrates a chart of terminal modes according to one or more aspects described herein.

According to one or more aspects, a conference server may trigger mode transitions in one or more participating terminals in response to a change in the organization of the terminals. FIG. 7 illustrates a chart describing four mode combinations in which a terminal may be placed. A mode, as used herein, may relate to a state in which the terminal is placed. For example, a terminal may be placed in a local mode, a stand-alone mode, a hands free mode or a headset mode. Combination of modes, e.g., a hands-free stand-alone mode combination, may also be achieved. These mode combinations include hands free (local), hands free (stand-alone), headset (local) and headset (stand-alone). A local mode relates to when a terminal and/or user is participating in a conference with other people in the same location. Stand-alone mode, on the other hand, refers to when a terminal and user are participating in a conference from a location independent of other participating terminals and/or users. Hands free mode allows a user to participate in a conference without having to hold or physically engage the terminal. Hands free systems and methods include speakerphones and microphones. Headset mode refers to situations where the terminal is providing audio through a non-public or broadcast output system (e.g., an earpiece). Additional or alternative modes may also be used in a teleconference system. In some configurations, one or more modes may correspond to the setting or modification of audio enhancements in the terminal. For example, setting a particular mode may affect the configuration parameters of an echo canceller function or feature (e.g., increase or decrease sensitivity).

Figure 8:
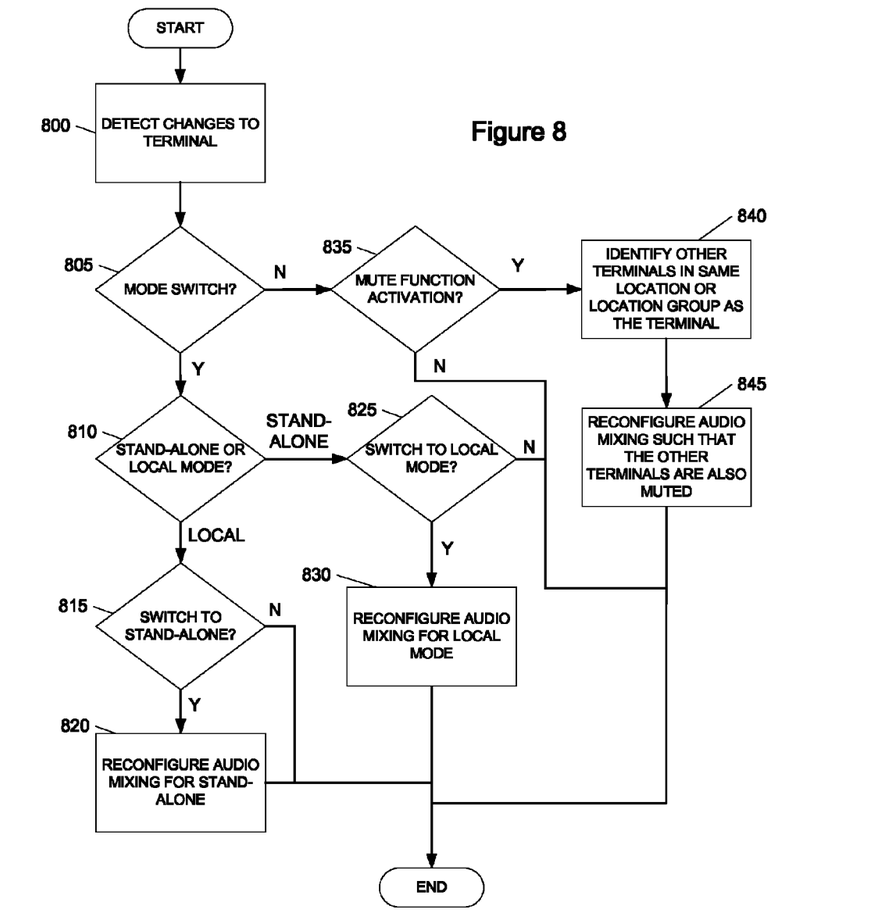
FIG. 8 is a flowchart illustrating a method for automatically reconfiguring audio mixing in response to changes to a terminal according to one or more aspects described herein.

When transitioning from one mode to another or when activating conferencing functionality, e.g., mute, a conference server or network master may need to reconfigure the audio mixing. FIG. 8 is a flowchart illustrating a method for automatic reconfiguration of audio signal mixing in response to detecting a change in terminal organization. In step 800, the conference server may detect a change to a terminal, e.g., a terminal's location or mode. This determination may be made based on the context fingerprints received from the terminal as discussed. Other methods of determining terminal location may also be used including manual entry by a user of the terminal's location and/or analysis of the terminal's network address. For example, a user may define, from a user interface of his or her terminal, that the terminal is close to another device. In another example, proximity may be defined based on two terminals having the same access point address. Service discovery protocols such as universal plug and play (UPnP), BLUETOOTH, simple service discovery protocol (SSDP) and the like may also be used to identify devices in proximity.

In step 805, the server or network master may determine whether the change corresponds to a mode switch. If the change is a mode switch, the conference server may determine whether the terminal is currently in a location or location group with other terminals (i.e., local mode) or if the terminal is alone (i.e., stand-alone) in step 810. If the terminal is determined to be in local mode, the conference server may subsequently determine whether the terminal is changing to a stand-alone mode in step 815. If so, the conference server may reconfigure audio mixing and associated audio streams such that audio from the other terminals in the room are transmitted to the terminal and audio from the terminal is provided to the other terminals in the room in step 820. In one or more configurations, if the terminal was previously connected to the teleconference through a local network master, the conference server may establish a new connection with the terminal independent of the local network master.

If, on the other hand, the terminal was in a stand-alone mode, the server may determine whether the terminal is transitioning into a local mode in step 825. If so, the conference server may reconfigure the audio mixing in step 830 such that the terminal's audio is no longer added to the audio stream distributed to the terminals in the local group. In one or more arrangements, if the local group uses a network master to connect to the conference server, the conference server may sever the connection with the terminal so that the terminal may reconnect through a local network master. Severing the connection may be performed prior to establishing a connection with the new server (i.e., the conference server).

If, however, the terminal is in local mode and has activated a mute functionality as determined in step 835, the conference server or network master may identify one or more other terminals at the same location as the terminal in step 840. Mute functionality may be used by a teleconference participant to prevent audio signals originating from a particular device or group of devices from reaching or being passed to other participants. Mute functionality, as described herein, may relate to both individual muting and group muting. Individual muting allows a user of a terminal to mute his or her own terminal whereas group muting enables muting of one or more other terminals in the same location. The other terminals may be identified using grouping information stored by the conference server or network master. In step 845, the conference server or network master may then reconfigure audio mixing such that the one or more other terminals are also removed from or muted in any downstream audio signals. That is, the audio signals from the one or more other terminals may be filtered out of any downstream audio signals. In one example, a mute command may be signaled to a conference server using session initiation protocol (SIP) by sending an INVITE request and setting the media flows to 'receiveonly' mode. In response, the conference server may transmit a confirmation message (e.g., 200 OK 'sendonly') to the terminal and may further ignore any audio signals received from terminals in the local group. The server may notify other participants in the same local group of the mute condition by sending them an INVITE with 'sendonly.' The other participant terminals may confirm receipt of the message (e.g., by transmitting 200 OK with 'receiveonly') to the conference server. The other participant terminals, upon receiving the notification from the server, may provide an indication to the user that the terminal is muted. Other teleconferencing and/or communication functionalities that may affect the way in which audio is mixed may be similarly processed by a network master or conference server.

Figure 9:
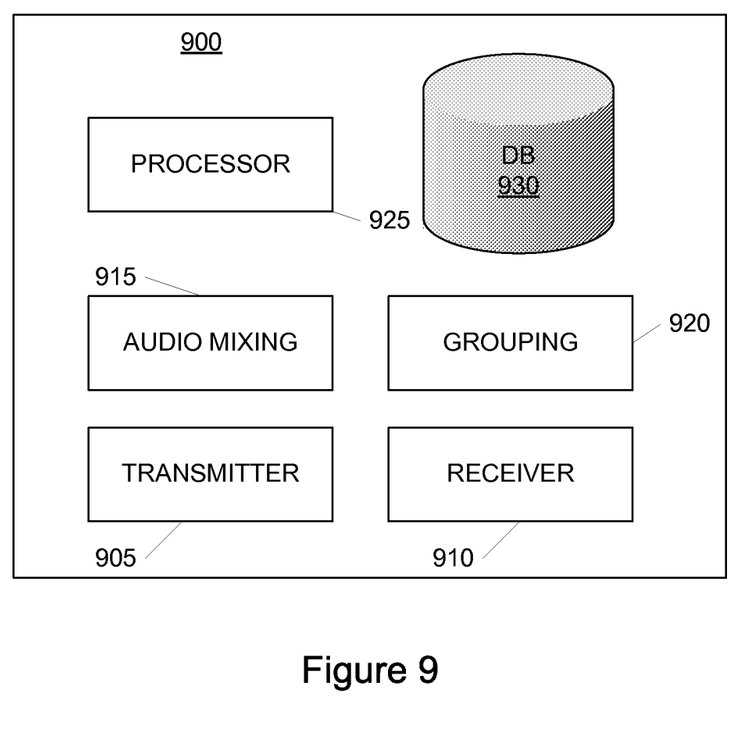
FIG. 9 illustrates a diagram of a conference server system according to one or more aspects described herein.

FIG. 9 illustrates a conference switch or network master system for facilitating audio routing and mixing in a teleconference. Master system 900 may include a variety of components including one or more transmitters 905, one or more receivers 910, audio mixing module 915, grouping module 920, processor 925 and database 930. Transmitter 905 and receiver 910 may be configured to transmit and receive, respectively, audio signals and other information from one or more terminals participating in a teleconference. Transmitter 905 and receiver 910 may be configured to receive both audio/voice signals as well as data such as sensor signals. In one example, transmitter 905 and receiver 910 may operate over a voice over IP network. Alternatively or additionally, multiple transmitters and/or receivers may be used to divide the transmission and reception, respectively, or voice/audio signals over a voice network versus data communicated over a data network. According to one or more aspects, grouping module 920 may receive context fingerprint information from participating terminals and, using processor 925, evaluate the information to form one or more location groups of terminals. The location group assignments may be stored in database 930. Once grouped, the audio signals may be routed by audio mixing module 915 and processor 925 in accordance with the location groupings. Grouping module 920 may further perform synchronization to insure that rapidly changing sensor signals are obtained at simultaneous or near simultaneous times from the various terminals. Without synchronization, terminals in the same location may report significantly different sensor readings, which may lead to grouping errors. In one or more configurations, the components of system 900 may further be integrated into one or more combined systems or divided into separate components.

Additionally, grouping module 920 may perform monitoring processes for determining a status (e.g., mode) of one or more terminals and whether a location of a terminal has changed. If a terminal's location has changed, grouping module 920 may notify audio mixing module 915 to modify the manner in which audio streams are generated for one or more terminals affected by the location change. Audio mixing module 915 may also reconfigure one or more audio streams in response to determining that a terminal associated with a location group has activated a mute function. The modules described may be implemented in a variety of ways including in hardware, software and/or combinations thereof.

Additionally, the methods and features recited herein may further be implemented through any number of computer readable mediums that are able to store computer readable instructions. Examples of computer readable media that may be used include RAM, ROM, EEPROM, flash memory or other memory technology, CD-ROM, DVD or other optical disk storage, magnetic cassettes, magnetic tape, magnetic storage and the like.

While illustrative systems and methods as described herein embodying various aspects of the present invention are shown, it will be understood by those skilled in the art, that the invention is not limited to these embodiments. Modifications may be made by those skilled in the art, particularly in light of the foregoing teachings. For example, each of the elements of the aforementioned embodiments may be utilized alone or in combination or subcombination with elements of the other embodiments. It will also be appreciated and understood that modifications may be made without departing from the true spirit and scope of the present invention. The description is thus to be regarded as illustrative instead of restrictive on the present invention.

We claim:

1. A method comprising: detecting, by a teleconference server, a change to a terminal participating in a teleconference managed by the teleconference server, wherein the teleconference includes a plurality of terminals located in a plurality of locations including a first location and a second location and wherein the terminal is located in the first location prior to the change; determining, by the teleconference server, whether the change corresponds to a location change of the terminal from the first location to another location, including:
receiving a first context fingerprint including first position coordinates indicating a position of the terminal; receiving a second context fingerprint including second position coordinates indicating a position of a second terminal; determining a physical distance between the terminal and the second terminal in the first location based on a difference between the first position coordinates and the second position coordinates, and determining whether the determined physical distance is within a threshold physical distance; and in response to determining that the physical distance is not within the threshold physical distance, adding an audio signal received from the terminal to one or more audio streams to be generated for the first location; in response to determining that the change does not correspond to the location change, determining whether the change corresponds to an activation of a local mute functionality of the terminal; in response to determining that the change corresponds to activation of the local mute functionality, determining a location group of the terminal, wherein the location group corresponds to the first location and includes a plurality of terminals; and generating at least one other audio stream for the second location, wherein generating the at least one other audio stream for the second location includes filtering out audio signals received from all terminals belonging to the location group, wherein the at least one other audio stream is different from the one or more audio streams to be generated for the first location.

2. The method of claim 1, wherein detecting the change includes monitoring one or more context fingerprints of the terminal.

3. The method of claim 2, wherein the one or more context fingerprints include information associated with at least one of global positioning system (GPS) coordinates, camera sensor signals, acoustic sensor signals, wireless network characteristics, global system for mobile communications (GSM) base station identification information and BLUETOOTH neighborhood information.

4. The method of claim 1, wherein the location change of the terminal includes movement from the first location to the second location and wherein the method further comprises:

filtering out the audio signal received from the terminal from at least one other audio stream intended for one or more terminals in the second location.

5. The method of claim 1, wherein determining whether the change corresponds to a location change of the terminal includes determining that the change corresponds to a switch, by the terminal, from a local mode to a stand-alone mode, wherein the local mode indicates participation in the teleconference from a location having one or more other participants and the stand-alone mode indicates participation in the teleconference from a location independent of other participants.

6. A non-transitory computer readable medium storing computer executable instructions that, when executed, cause an apparatus to: detect a change to a terminal participating in a teleconference managed by the apparatus, wherein the teleconference includes a plurality of terminals located in a plurality of locations including a first location and a second location and wherein the terminal is located in the first location prior to the change; determine whether the change corresponds to a location change of the terminal from the first location to another location, including: receiving a first context fingerprint including first position coordinates indicating a position of the terminal; receiving a second context fingerprint including second position coordinates indicating a position of a second terminal; determining a physical distance between the terminal and the second terminal in the first location based on a difference between the first position coordinates and the second position coordinates, and determining whether the determined physical distance is within a threshold physical distance; and in response to determining that the physical distance is not within the threshold physical distance, add an audio signal received from the terminal to one or more audio streams to be generated for the first location; in response to determining that the change corresponds to activation of the local mute functionality, determining a location group of the terminal, wherein the location group corresponds to the first location and includes a plurality of terminals; and generating at least one other audio stream for the second location, wherein generating the at least one other audio stream for the second location includes filtering out audio signals received from all terminals belonging to the location group, wherein the at least one other audio stream is different from the one or more audio streams to be generated for the first location.

7. The non-transitory computer readable medium of claim 6, wherein the instructions for detecting the change includes further instructions for monitoring one or more context fingerprints of the terminal.

8. The non-transitory computer readable medium of claim 7, wherein the one or more context fingerprints include information associated with at least one of global positioning system (GPS) coordinates, camera sensor signals, acoustic sensor signals, global system for mobile communications (GSM) base station identification information and BLUETOOTH neighborhood information.

9. The non-transitory computer readable medium of claim 6, wherein the location change of the terminal includes movement from the first location to the second location and wherein the computer readable instructions, when executed, further cause the apparatus to:
filter out the audio signal received from the terminal from at least one other audio stream intended for one or more terminals in the second location.

10. The non-transitory computer readable medium of claim 6, wherein the instructions for determining whether the change corresponds to a location change of the terminal includes further instructions for determining that the change corresponds to a switch, by the terminal, from a local mode to a stand-alone mode, wherein the local mode indicates participation in the teleconference from a location having one or more other participants and the stand-alone mode indicates participation in the teleconference from a location independent of other participants.

11. An apparatus comprising: at least one processor; and memory operatively coupled to the at least one processor and storing computer readable instructions that, when executed, cause the apparatus to: detect a change to a terminal participating in a teleconference managed by the apparatus, wherein the teleconference includes a plurality of terminals located in a plurality of locations including a first location and a second location and wherein the terminal is located in the first location prior to the change; determine whether the change corresponds to a location change of the terminal from the first location to another location, including: receiving a first context fingerprint including first position coordinates indicating a position of the terminal; receiving a second context fingerprint including second position coordinates indicating a position of a second terminal; determining a physical distance between the terminal and the second terminal in the first location based on a difference between the first position coordinates and the second position coordinates, and determining whether the determined physical distance is within a threshold physical distance; and in response to determining that the physical distance is not within the threshold physical distance, add an audio signal received from the terminal to one or more audio streams to be generated for the first location; in response to determining that the change corresponds to activation of the local mute functionality, determining a location group of the terminal, wherein the location group corresponds to the first location and includes a plurality of terminals; and generating at least one other audio stream for the second location, wherein generating the at least one other audio stream for the second location includes filtering out audio signals received from all terminals belonging to the location group, wherein the at least one other audio stream is different from the one or more audio streams to be generated for the first location.

12. The apparatus of claim 11, wherein detecting the change is performed based on context fingerprint information received from the terminal, wherein the context fingerprint information is derived from one or more sensor readings taken by the terminal, and
wherein the context fingerprint information includes at least one of global positioning system (GPS) coordinates, camera sensor signals, acoustic sensor signals, global system for mobile communications (GSM) base station identification information and BLUETOOTH neighborhood information.

13. The apparatus of claim 11, wherein the computer readable instructions, when executed, further cause the apparatus to monitor for the change to the terminal using session initiation protocol (SIP).

14. An apparatus comprising: means for detecting a change to a terminal participating in a teleconference managed by the apparatus, wherein the teleconference includes a plurality of terminals located in a plurality of locations including a first location and a second location and wherein the terminal is located in the first location; means for determining whether the change corresponds to a location change of the terminal from the first location to another location, including: means for receiving a first context fingerprint including first position coordinates indicating a position of the terminal; means for receiving a second context fingerprint including second position coordinates indicating a position of a second terminal;

means for determining a physical distance between the terminal and the second terminal in the first location based on a difference between the first position coordinates and the second position coordinates, and means for determining whether the determined physical distance is within a threshold physical distance; and means for adding, in response to determining that the physical distance is not within the threshold physical distance, an audio signal received from the terminal to one or more audio streams to be generated for the first location; in response to determining that the change corresponds to activation of the local mute functionality, determining a location group of the terminal, wherein the location group corresponds to the first location and includes a plurality of terminals; and generating at least one other audio stream for the second location, wherein generating the at least one other audio stream for the second location includes filtering out audio signals received from all terminals belonging to the location group, wherein the at least one other audio stream is different from the one or more audio streams to be generated for the first location.

15. The apparatus of claim 14, wherein the location change of the terminal includes moving from the first location to the second location and wherein the apparatus further comprises:
means for filtering out the audio signal received from the terminal from at least one other audio stream intended for one or more terminals in the second location.

16. The method of claim 3, further comprising:
determining whether at least one of the one or more context fingerprints is received from each terminal of the plurality of terminals; and
requesting a context fingerprint from each of one or more terminals from which a context fingerprint is not received.

17. The method of claim 6, wherein, when the requesting includes transmitting more than one request for context fingerprints, the transmission of the requests are synchronized.

18. The method of claim 1, wherein the time at which the first context fingerprint is received is synchronized with the time at which the second context fingerprint is received.

* * * * *

UNITED STATES PATENT AND TRADEMARK OFFICE
CERTIFICATE OF CORRECTION

PATENT NO. : 8,503,651 B2
APPLICATION NO. : 11/616492
DATED : August 6, 2013
INVENTOR(S) : Jussi Virolainen et al.

Page 1 of 1

It is certified that error appears in the above-identified patent and that said Letters Patent is hereby corrected as shown below:

In the Claims
In Column 14, Claim 17, Line 14,
    Please delete "6" and insert --16--.

Signed and Sealed this
Fourth Day of March, 2014

Michelle K. Lee
*Deputy Director of the United States Patent and Trademark Office*